(12) United States Patent
Lin (10) Patent No.: US 10,102,138 B2
(45) Date of Patent: Oct. 16, 2018

(54) DIVISION OF DATA STORAGE IN SINGLE-STORAGE DEVICE ARCHITECTURE

(71) Applicant: Western Digital Technologies, Inc., Irvine, CA (US)

(72) Inventor: Tino Lin, Tustin, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 414 days.

(21) Appl. No.: 14/920,834

(22) Filed: Oct. 22, 2015

(65) Prior Publication Data

US 2017/0116131 A1  Apr. 27, 2017

(51) Int. Cl.
G06F 12/10  (2016.01)
G06F 9/44  (2018.01)
G06F 9/4401  (2018.01)

(52) U.S. Cl.
CPC ............. *G06F 12/10* (2013.01); *G06F 9/441* (2013.01); *G06F 2212/1041* (2013.01); *G06F 2212/65* (2013.01)

(58) Field of Classification Search
CPC .. G06F 12/10; G06F 9/441; G06F 2212/1041; G06F 2212/65
See application file for complete search history.

(56) References Cited

U.S. PATENT DOCUMENTS

| | | | |
|---|---|---|---|
| 6,499,054 B1 | 12/2002 | Hesselink et al. | |
| 6,732,158 B1 | 5/2004 | Hesselink et al. | |
| 7,111,121 B2 | 9/2006 | Oishi et al. | |
| 7,120,692 B2 | 10/2006 | Hesselink et al. | |
| 7,454,443 B2 | 11/2008 | Ram et al. | |
| 7,467,187 B2 | 12/2008 | Hesselink et al. | |
| 7,546,353 B2 | 6/2009 | Hesselink et al. | |
| 7,587,467 B2 | 9/2009 | Hesselink et al. | |
| 7,600,036 B2 | 10/2009 | Hesselink et al. | |
| 7,788,404 B2 | 8/2010 | Hesselink et al. | |
| 7,917,628 B2 | 3/2011 | Hesselink et al. | |
| 7,934,251 B2 | 4/2011 | Hesselink et al. | |
| 7,949,564 B1 | 5/2011 | Hughes et al. | |

(Continued)

OTHER PUBLICATIONS

International Search Report and Written Opinion for PCT/US2016/057713 dated Feb. 2, 2017.

*Primary Examiner* — Larry T Mackall
(74) *Attorney, Agent, or Firm* — Chang & Hale LLP (57) ABSTRACT

Systems and methods are disclosed for sub-dividing data in non-volatile data storage modules. A data storage device includes a non-volatile memory comprising a plurality of physical addresses (PBAs) storing data for a first logical unit number (LUN) and a second LUN, as well as controller circuitry configured to receive a storage access request from a host system, the storage access request including a logical address (LBA), an address range, and LUN identification information. The controller circuitry is further configured to map the LBA to a translated LBA that is one of N contiguous comprehensive LBAs based on the LBA and the LUN identification information, the comprehensive LBAs being associated with both the first LUN and the second LUN, map the translated LBA to one of the plurality of PBAs of the non-volatile memory, and read from or write to at least the one of the plurality of PBAs.

20 Claims, 4 Drawing Sheets

(56) References Cited

U.S. PATENT DOCUMENTS

| | | |
|---|---|---|
| 8,004,791 B2 | 8/2011 | Szeremeta et al. |
| 8,255,661 B2 | 8/2012 | Karr et al. |
| 8,285,965 B2 | 10/2012 | Karr et al. |
| 8,341,117 B2 | 12/2012 | Ram et al. |
| 8,341,275 B1 | 12/2012 | Hesselink et al. |
| 8,352,567 B2 | 1/2013 | Hesselink et al. |
| 8,526,798 B2 | 9/2013 | Hesselink |
| 8,631,284 B2 | 1/2014 | Stevens |
| 8,646,054 B1 | 2/2014 | Karr et al. |
| 8,661,507 B1 | 2/2014 | Hesselink et al. |
| 8,688,797 B2 | 4/2014 | Hesselink et al. |
| 8,713,265 B1 | 4/2014 | Rutledge |
| 8,762,682 B1 | 6/2014 | Stevens |
| 8,780,004 B1 | 7/2014 | Chin |
| 8,793,374 B2 | 7/2014 | Hesselink et al. |
| 8,819,443 B2 | 8/2014 | Lin |
| 8,838,892 B2 | 9/2014 | Li |
| 9,547,459 B1* | 1/2017 | BenHanokh .......... G06F 3/0689 |
| 2003/0065925 A1* | 4/2003 | Shindo .................. G06F 21/10 713/178 |
| 2005/0144195 A1 | 6/2005 | Hesselink et al. |
| 2005/0144200 A1 | 6/2005 | Hesselink et al. |
| 2006/0064568 A1 | 3/2006 | Seto et al. |
| 2007/0204128 A1 | 8/2007 | Lee et al. |
| 2007/0282951 A1* | 12/2007 | Selimis .................. H04L 67/06 709/205 |
| 2009/0222496 A1* | 9/2009 | Liu ....................... G06F 3/0482 |
| 2012/0036041 A1 | 2/2012 | Hesselink |
| 2013/0179626 A1 | 7/2013 | Chang et al. |
| 2013/0212401 A1 | 8/2013 | Lin |
| 2013/0266137 A1 | 10/2013 | Blankenbeckler et al. |
| 2013/0268749 A1 | 10/2013 | Blankenbeckler et al. |
| 2013/0268759 A1 | 10/2013 | Blankenbeckler et al. |
| 2013/0268771 A1 | 10/2013 | Blankenbeckler et al. |
| 2014/0084850 A1* | 3/2014 | Lee ........................ G06F 1/266 320/107 |
| 2014/0095439 A1 | 4/2014 | Ram |
| 2014/0169921 A1 | 6/2014 | Carey |
| 2014/0173215 A1 | 6/2014 | Lin et al. |
| 2014/0281312 A1 | 9/2014 | Danilak et al. |

\* cited by examiner

FIG. 3

|  | LUN A | | | | | | | | LUN B | | | | | | |
|---|---|---|---|---|---|---|---|---|---|---|---|---|---|---|---|
| COMPREHENSIVE LBA#: | LBA 0 | LBA 1 | LBA 2 | LBA 3 | LBA 4 | LBA 5 | LBA 6 | LBA 7 | | | | | | | |
| LUN-SPECIFIC LBA#: | LBA A0 | LBA A1 | LBA A2 | LBA A3 | LBA B0 | LBA B1 | LBA B2 | LBA B3 | | | | | | | |
| | LBA 8 | LBA 9 | LBA 10 | LBA 11 | LBA 12 | LBA 13 | LBA 14 | LBA 15 | | | | | | | |
| | LBA A4 | LBA A5 | LBA A6 | LBA A7 | LBA B4 | LBA B5 | LBA B6 | LBA B7 | | | | | | | |
| | LBA 16 | LBA 17 | LBA 18 | LBA 19 | LBA 20 | LBA 21 | LBA 22 | LBA 23 | | | | | | | |
| | LBA A8 | LBA A9 | LBA A10 | LBA A11 | LBA B8 | LBA B9 | LBA B10 | LBA B11 | | | | | | | |
| | LBA 24 | LBA 25 | LBA 26 | LBA 27 | LBA 28 | LBA 29 | LBA 30 | LBA 31 | | | | | | | |
| | LBA A12 | LBA A13 | LBA A14 | LBA A15 | LBA B12 | LBA B13 | LBA B14 | LBA B15 | | | | | | | |
| | LBA 32 | LBA 33 | LBA 34 | LBA 35 | LBA 36 | LBA 37 | LBA 38 | LBA 39 | | | | | | | |
| | LBA A16 | LBA A17 | LBA A18 | LBA A19 | LBA B16 | LBA B17 | LBA B18 | LBA B19 | | | | | | | |
| | LBA 40 | LBA 41 | LBA 42 | LBA 43 | LBA 44 | LBA 45 | LBA 46 | LBA 47 | | | | | | | |
| | LBA A20 | LBA A21 | LBA A22 | LBA A23 | LBA B20 | LBA B21 | LBA B22 | LBA B23 | | | | | | | |

DIVISION OF DATA STORAGE IN SINGLE-STORAGE DEVICE ARCHITECTURE

BACKGROUND

Computing systems can utilize a plurality of data storage drives for storing user data, and the like. The use of multiple data storage drives can present various system complexities.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

DETAILED DESCRIPTION

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

The headings provided herein are for convenience only and do not necessarily affect the scope or meaning of the claims. Disclosed herein are example configurations and embodiments relating to data storage division in a single-drive storage architecture.

Overview

The present disclosure provides systems and methods for designating data storage addresses in a single data storage device or drive to separate logical unit numbers (LUNs), which may be managed according to any desirable or practical storage management scheme.

The utilization of multiple physically and/or logically distinct data storage devices by a single host may be desirable for various purposes. Such devices/drives may be managed according to any of various redundancy and/or non-redundancy schemes. For example, in certain contexts, management of multiple devices/drives according to a JBOD ("just a bunch of disks") scheme may be desirable, wherein each of the multiple devices/drives may represent a separate logical volume. The terms "data storage drive" and "data storage device" are used herein according to their broad and ordinary meaning, and may be used substantially interchangeably in certain contexts in the present disclosure to refer to a data storage device, module, enclosure, and/or associated components and/or devices.

Connection of a single host to multiple data storage devices/modules (e.g., external data storage devices) may be advantageous for various purposes, such as to provide the ability to load separate operating systems from each of the devices/modules. Where the host device/system is coupled to a plurality of storage devices and is configured to use a single power bus to supply operational power thereto (e.g., over a Universal Serial Bus (USB) port/connection), the power burden on the host may be undesirably high, particularly with respect to hard disk storage drives that may require power to spin-up magnetic disk(s) and/or operate head/gimbal circuitry and components.

Furthermore, in certain embodiments, when booting from, for example, external data storage devices/drives, each operating system may be required to provide its own boot partition that is guaranteed to boot, substantially irrespective of the relevant firmware interface (e.g., BIOS, UEFI). Generally, the boot partition may be incapable of loading operating systems other than its own.

Certain embodiments disclosed herein provide systems and methods for managing multiple logical volumes of storage in a single data storage device/drive, such as a hard disk drive (HDD). The separate logical volumes may be designated separate subsets of logical block addresses (LBAs) used to map to physical addresses of the single storage device, such as in an interleaved and/or alternating scheme. The external data storage device/drive may be a direct-attached storage drive (DAS), network-attached storage drive (NAS), or other type of device/drive.

Embodiments disclosed herein may provide for utilization of multiple logical volumes of storage with an at least partially reduced power requirement compared to other systems utilizing separate physical storage drives, such as dual-HDD systems. For example, systems disclosed herein may provide a DAS JBOD drive that uses only a single HDD (e.g., 2.5" disk drive) that may allow for booting separate operating systems (e.g., OSX and/or Windows) externally without having to go through a firmware process to jump from a first operating system to the next.

Data Storage System

Figure 1:
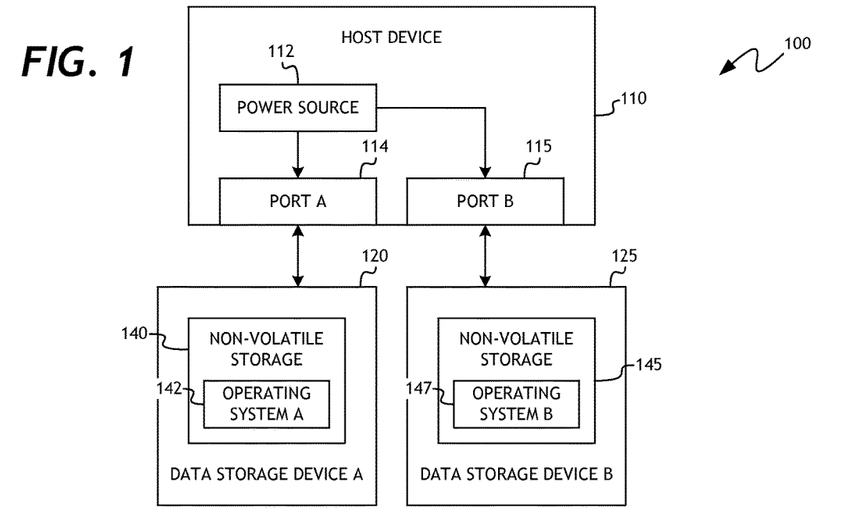
FIG. 1 is a block diagram representing a data storage system according to an embodiment.

FIG. 1 is a block diagram of a system including a host device 110 that is communicatively coupled to one or more data storage devices, such as "data storage device A" 120 and/or "data storage device B" 125. The host device 110 may be coupled to the data storage device(s) over any suitable or desirable communications interface, such as a wired or wireless communication interface. In certain embodiments, the host device 110 is coupled to the data storage devices over separate physical interface ports, shown as "port A" 114 and "port B" 115. For example, the ports 114, 115 may be universal serial bus (USB) ports, or the like.

The data storage devices 120, 125 may each comprise non-volatile storage, illustrated as blocks 140 and 145, respectively. In certain embodiments, each of the data storage devices 120, 125 is configured to store an operating system. For example, data storage device A (120) may store a first operating system 142, whereas data storage device B (125) may store a second operating system 147, wherein the first operating system and the second operating system may be different types of operating systems in certain embodiments. For example, in an embodiment, operating system A (142) may be a Windows, Linux, Mac OS, or other type of Unix-based or other operating system, whereas operating system B (147) may be a different one of such possible operating systems.

The non-volatile storage 140, 145 may comprise any type of non-volatile data storage media. For example, the non-volatile storage may comprise magnetic disk media, solid-state media, optical media, or other type of non-volatile storage. In certain embodiments, one or more of the data storage devices 120, 125 may be configured to receive operational power from the host device 110 over a respective port of the host device. The host device 110 may include one or more power sources 112, which may be configured to provide power that one or more voltage levels to either or both of the ports 114, 115. For example, the host device 110 may provide bus power for powering rotating disk media associated with the data storage devices 120, 125. However, in the case of rotating disk media, such media assemblies may consume more power/current than is available on the power bus (e.g., 5V USB power), particularly with respect to mobile host computing devices, such as laptop/tablet computers and the like. Therefore, power limitations may make connecting and powering multiple disk drives over host interface(s) impractical or undesirable. Alternative embodiments may implement separate power cables and/or interface hubs for providing connectivity and/or power for the data storage devices. However, such configurations may introduce undesirable complexity, physical constraints and/or performance issues.

Figure 2:
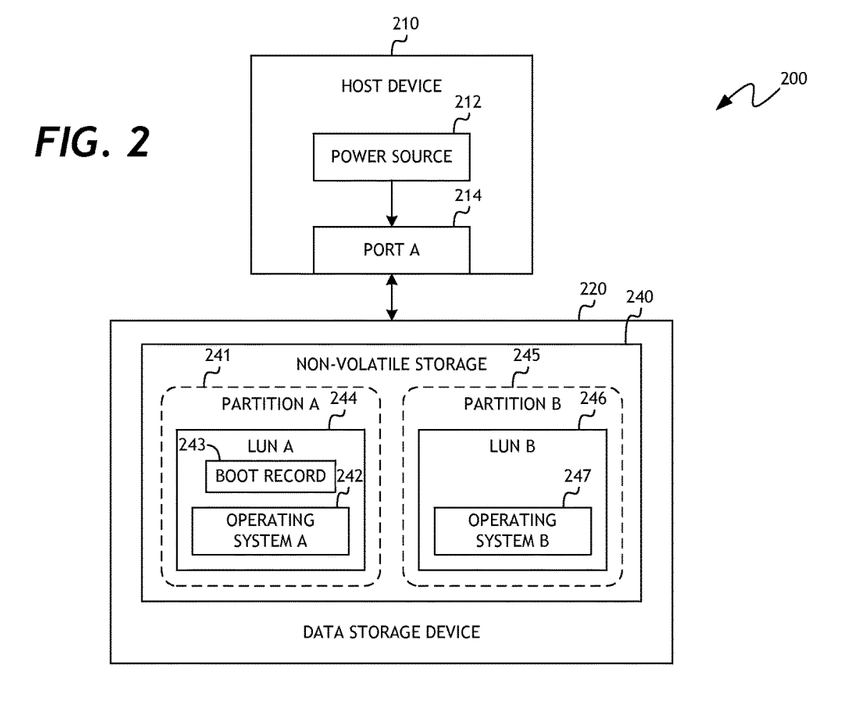
FIG. 2 is a block diagram representing a data storage system according to an embodiment.

FIG. 2 is a block diagram illustrating a system 200 including a host device 210 communicatively coupled to a data storage device 220. The host device 210 may be coupled to the data storage device 220 over a communications interface via a communication port 214 of the host device 210. In certain embodiments, the host device 210 is configured to provide power to the data storage device 220 via the port 214. The power may be provided by a power source 212 of the host device 210.

In certain embodiments, the non-volatile storage 240 of the data storage device 220 is partitioned (e.g., using multi-boot utility software/firmware), wherein separate logical containers ("partitions") are used to house separate filesystems, where operating systems, applications and/or data may be stored. In certain embodiments, each partition of the storage is associated with a separate logical unit number (LUN). For example, as shown, the non-volatile storage 240 may be divided into a first partition 241 and a second partition 245. The first partition (e.g., primary partition), or "partition A," may include a first LUN 244, identified as "LUN A," whereas the second partition, or "partition B," may include a second LUN, identified as "LUN B." LUN A (244) may include a boot record 243 including system data related to booting procedures of the host device 210 and/or data storage device 220.

In certain embodiments, on start-up the operating system 242 of the first LUN 244 is generally booted up first. For example, the host device 210 may be configured to boot from the data storage device 220 by loading operating system A (242) at start-up. During start-up, the host device 210 may locate operating system A (242) on LUN A in the primary partition 241. Once the host device 210 has booted operating system A (242), the host device may implement a boot manager program to boot operating system B (247). For example, the partition scheme illustrated in FIG. 2 may enable the loading of the second operating system 247 from the second LUN 246 once the first operating system has been booted. The host device 210 may be configured to execute software that effects the transition from the first operating system 242 to the second operating system 247.

The partitions of the non-volatile storage 240 may be created by the host 210 using a multi-boot utility program (e.g., "Boot Camp," by Apple Inc.), which may provide for non-destructive disk partitioning of the non-volatile storage 240. However, in certain embodiments, disk partitioning may result in a media in which one partition is substantially susceptible to corruption from corruption of another partition of the media. Such corruption may result in loss of mapping and/or other system data, thereby rendering the filesystem(s) of the non-volatile storage 240 effectively unusable.

Combined Storage

Certain embodiments disclosed herein allow for the utilization by a host device/system of at least two physically and/or logically separate storage devices/drives for data storage. Connectability of two or more data storage devices/drives may be desirable in a number of situations, such as where the ability to boot from two separate operating systems is desirable. Furthermore, because the connection of physically separate drives can lead to power concerns, as described above, certain embodiments herein advantageously provide two or more separate data storage device/drive connectability in a single physical device/drive, where the host sees two or more separate disks through connection with a single device/drive that requires only enough power for a single drive.

As described above in connection with FIG. 2, where multiple partitions are formed on a single non-volatile storage module, corruption of one partition may adversely affect other partition(s). Conversely, certain embodiments disclosed herein provide for storage on separate LUNs on a single storage device/drive. Therefore, the host device/system firmware may identify each of the physical disks independently. For example, the host may view the separate LUNs as physically different storage devices/drives according to, for example, a JBOD storage management scheme. While certain embodiments are disclosed herein in the context of management of separate LUNs managed according to a JBOD scheme, it should be understood that such embodiments may be implemented according to various RAID ("redundant array of independent disks") or other redundancy schemes, or the like, within the scope of the present disclosure.

Figure 3:
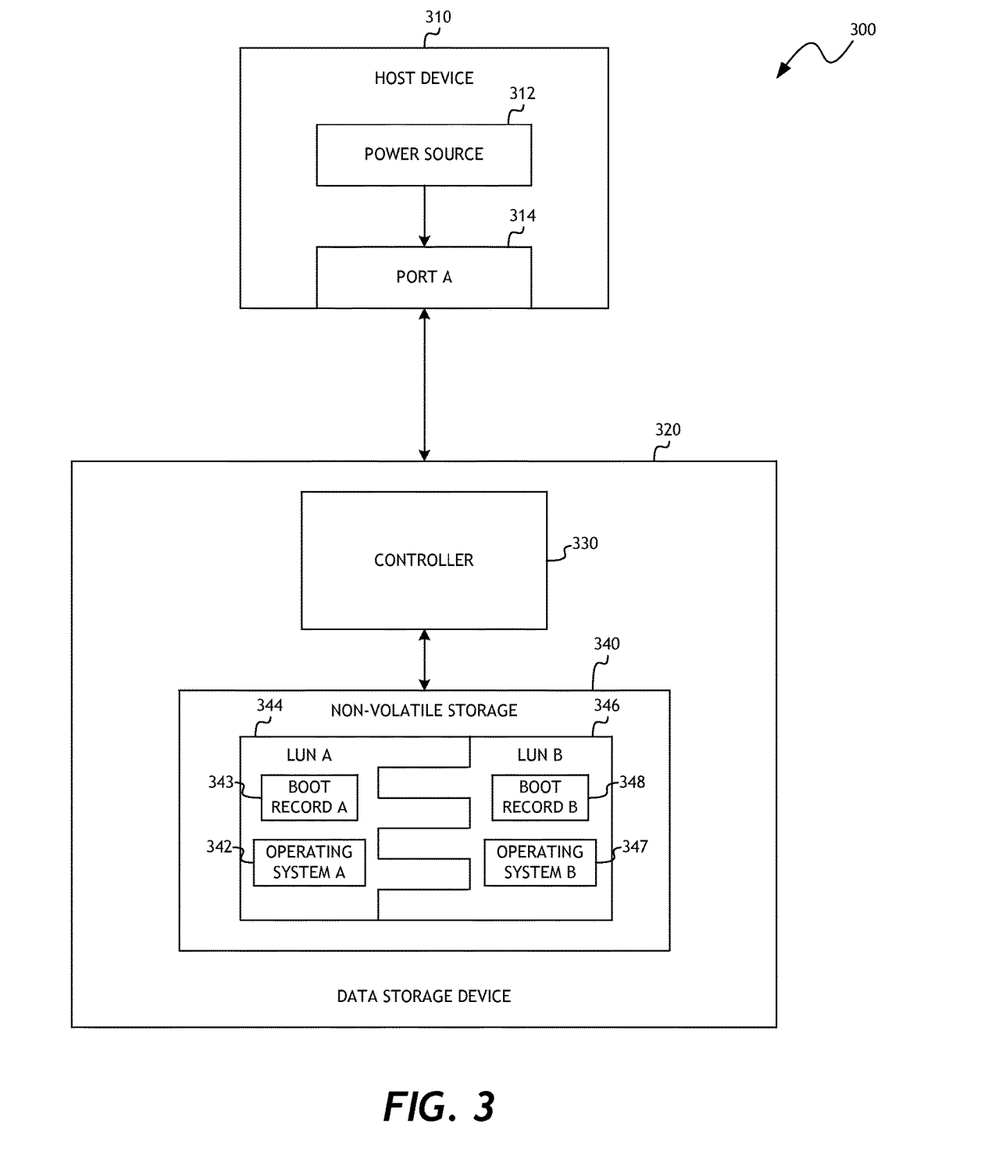
FIG. 3 is a block diagram representing a data storage system according to an embodiment.

FIG. 3 is a block diagram illustrating a system 300 comprising a host device 310 communicatively coupled to a data storage device 320 via a port 314 of the host device 310. In certain embodiments, the host device 310 may be configured to boot from the data storage device 320. Although the data storage device 320 may comprise a single non-volatile storage module 340 (e.g., disk media), the host device firmware may view the non-volatile storage as two or more separate LUNs (344, 346), such as in a JBOD configuration/relationship. With separate JBOD LUNs, the non-volatile storage 340 may provide improved storage features over a partitioned storage, as described above. For example, in certain embodiments, access may be provided to a host to only one of the LUNs, or access may be limited to one or more LUNs. Because each LUN (344, 346) is viewed as a separate physical disk by the host, corruption of the filesystem of one LUN may not substantially affect the other LUN(s).

The data storage device includes a controller 330, which may comprise one or more processors and/or memory modules for directing operation of the data storage device 320. The controller 330 may be configured to receive data commands from the host 310 and execute such commands in the non-volatile storage 340. Such commands may include data read/write commands, and the like. The controller 330 may be configured to receive data commands from a storage interface (e.g., a device driver) residing on the host 310. Data commands may specify a logical block address (LBA)

in the data storage device 120; data may be accessed/ transferred based on such commands. Where the non-volatile storage 340 includes multiple separate LUNs, the data access commands may also specify a particular LUN among a plurality of LUNs. The non-volatile storage 340 may comprise magnetic disk storage, for example. The non-volatile storage 340 may be used to store the plurality of LUN's. For example, the plurality of LUNs may be stored in interleaved manner with respect to logical addressing of the non-volatile storage 340.

The data storage device 320 can store data received from the host 310 such that the data storage device 320 acts as data storage for the host 310. To facilitate this function, the controller 330 may implement a logical interface for presenting to the host 310 each of the LUNs of the non-volatile storage 340 as a set of logical addresses (e.g., sequential/contiguous addresses) where data can be stored. Internally, the controller 330 can map LUN-specific logical addresses to translated comprehensive LBAs, and further map the translated LBAs to various physical memory addresses in the non-volatile storage 340. Mapping data indicating the mapping of LUN-specific logical addresses to translated comprehensive LBAs, and from translated comprehensive LBAs to physical memory addresses, may be maintained in the data storage device 320. For example, mapping table data may be stored in non-volatile storage 340 in order to allow for recreation of mapping tables following a power cycle.

Certain embodiments disclosed herein provide for JBOD management of a plurality of LUNs using a single data storage device, wherein non-volatile media of the data storage device is logically and/or physically divided to achieve the same. With respect to disk media embodiments, the data storage media may be divided in such a way as to substantially equally distributed the LUNs in the inner-diameter and outer-diameter. Such a distribution mechanism may allow substantially equal performance on the plurality of disk LUNs.

The controller 330 may include one or more memory modules (not shown), such as non-volatile memory (e.g., ROM) and/or volatile memory (e.g., RAM, such as DRAM). In certain embodiments, the controller 330 may be configured to store information, including, for example, operating system(s) code, application code, system tables and/or other data, in the non-volatile solid-state storage 340. On power-up, the controller 330 may be configured to load such data for use in operation of the data storage device.

The controller 330 illustrated in FIG. 3 may represent a device controller associated with the data storage device 320 and/or a bridge device, wherein address mapping and/or other functionality disclosed herein may be implemented at least in part by the controller/bridge 330, such as through execution of firmware associated therewith. For example, bridge circuitry may sit between the device controller and the host device 310, such that the bridge circuitry presents to the device controller the translated comprehensive LBA(s) associated with the host command. In certain embodiments, the controller 330 comprises a USB bridge module or device configured to implement certain features disclosed herein.

Disclosed herein are data storage devices and systems comprising control circuitry configured to provide a second LBA mapping abstraction layer, providing LUN-specific address-to-comprehensive address mapping prior to logical-to-physical address mapping. The controller/bridge 330 may receive data storage commands from the host 310 that include a logical address (LBA) associated with one of the LUNs of the non-volatile storage; that is, the LBA may identify an LUN as well as an LBA of the identified LUN. The controller/bridge 330 may be configured to take the LUN-specific LBA and translate it to a translated LBA associated with a comprehensive, contiguous range of LBAs of the non-volatile storage that may include all of the LUNs of the non-volatile storage 340. Controller circuitry of the data storage device 320 may further map the translated LBA to a physical address associated with the storage media for storage therein.

In certain embodiments, the non-volatile storage 340 comprises a comprehensive range of LBAs that is subdivided among the separate LUNs of the storage according to some address division scheme; that is, some or each of the comprehensive LBAs may be associated with a LUN-specific LBA associated with one of the LUNs. In certain embodiments, subsets of contiguous addresses of the comprehensive LBAs are each associated with one of the LUNs. For example, alternating subsets may be associated with the respective LUNs (see, e.g., FIG. 4). In certain embodiments, where host data associated with a command is translated such that the host data is assigned to more than one subset of the comprehensive LBAs, the control circuitry 330 may be configured to generate a plurality of data storage access commands, one for each of the subsets of LBAs associated with the translated host data addresses.

The data storage device 320 may comprise a single direct-attached storage device (DAS) that is viewed by the host device 310 as a plurality of drives. In certain embodiments, each of the LUNs of the non-volatile storage 340 may store a separate operating system (342, 347). For example, as shown, a first LUN 344 may include a first operating system 342 and a second LUN 346 may include a second operating system 347. In certain embodiments, the host manages the separate LUNs according to a JBOD scheme. Therefore, operating system A (342) and operating system B (347) may not operate on the same partition table. In certain embodiments, each of the LUNs may be separately partitionable. Furthermore, each LUN may have its own independent boot record, as shown.

The host device 310 and/or control circuitry 330 may be configured to implement firmware that maps a first portion (e.g., approximately half) of the LBAs of the non-volatile storage to LUN A (344), and a second portion to LUN B (346). When dividing the LBAs of the non-volatile storage 340 among the LUNs, it may be desirable to implement a scheme that promotes similar performance with respect to each of the LUNs. For example, wherein the non-volatile storage comprises a disk storage module, it may be beneficial to substantially evenly distribute portions, or "chunks," of the LBAs assigned to a first LUN and portions, or "chunks," of the LBAs assigned to a second LUN. In certain embodiments, chunks of LBAs assigned to respective LUNs are approximately 1 Mb in size. However, chunks of any size or comprising any number of LBAs may be implemented in accordance with embodiments disclosed herein.

In certain embodiments, the host device 310 may boot from the data storage device 320 at least in part by loading either of the operating systems 342, 347. That is, in certain embodiments, it may not be necessary for the host device 310 to initially load a primary operating system prior to loading a secondary operating system. Because each of the operating systems 342, 347 may be loaded independently of one another, each of the LUN's 344, 346 may include a separate boot record (343, 348). During start-up, the host device system 310 may see two separate LUNs, as well as two separate boot records. Therefore, the host 310 may boot either of the operating systems independently of the other.

Interleaved Logical Addressing

Various assignment schemes may be implemented for dividing the comprehensive LBAs of a storage device (e.g., the storage device 320 of FIG. 3). In certain embodiments, LBAs may advantageously be divided in such a manner as to promote similar performance between separate LUNs. For example, with respect to disk media, performance may be at least partially different with respect to physical addresses in a region near an outer diameter of the disk compared to physical addresses in a region near an inner diameter of the disk. Therefore, interleaved, alternating chunks of contiguous LBAs may be implemented to promote evenness of LUN representation across the media. For solid-state media, such uneven performance concerns may be less relevant, and therefore certain embodiments may simply assign a first-half portion of the comprehensive LBAs to a first LUN, and a second-half portion to a second LUN.

Figure 4:
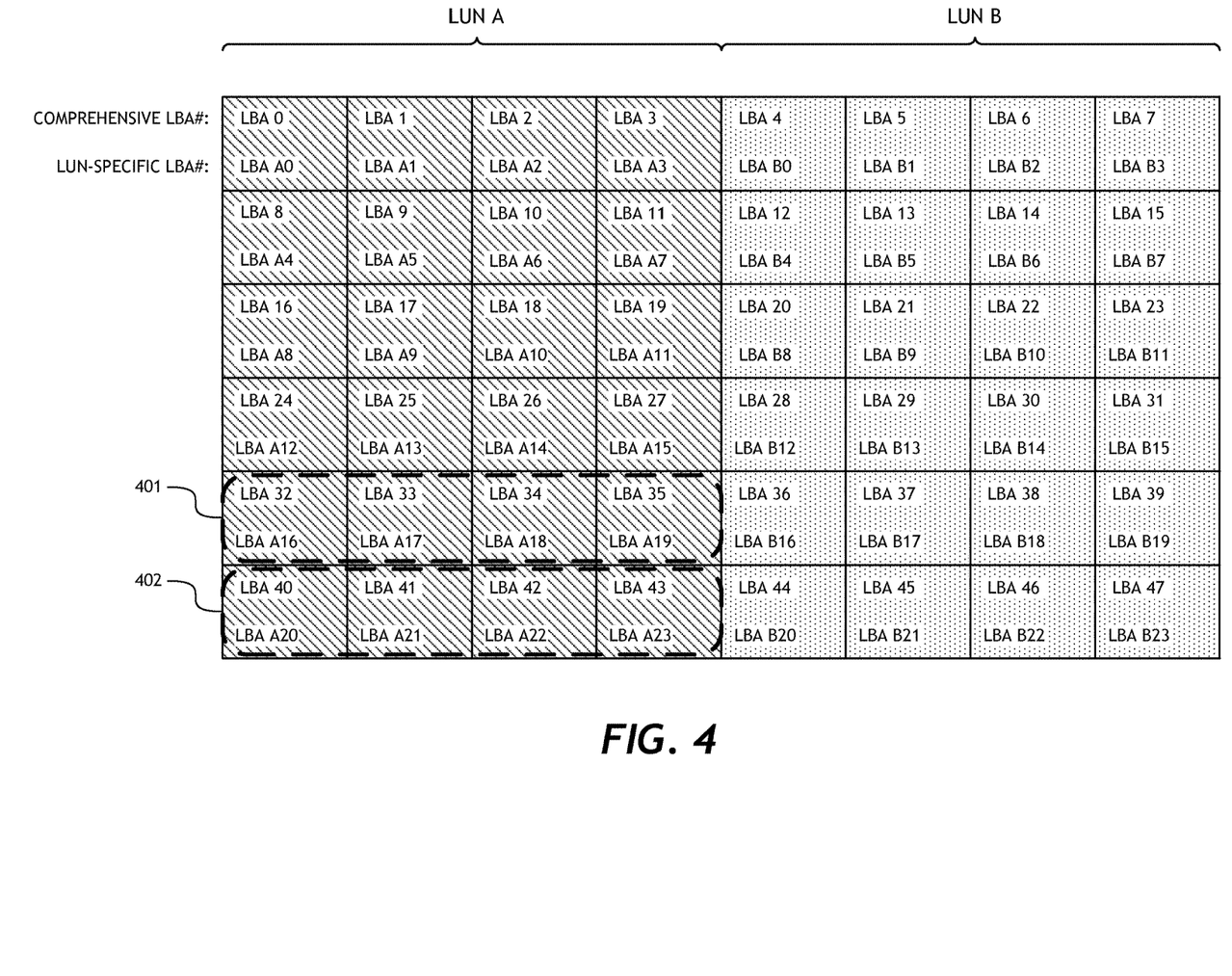
FIG. 4 is a block diagram illustrating a range of logical addresses of non-volatile storage in accordance with one or more embodiments.

FIG. 4 is a block diagram illustrating a comprehensive range of logical addresses of non-volatile storage in accordance with one or more embodiments. In the address division scheme of FIG. 4, different subsets, or chunks, of contiguous LBAs of a comprehensive range of contiguous LBAs may be assigned to different LUNs. For example, in certain embodiments, alternating subsets of M contiguous LBAs may be assigned to different LUNs. For illustration purposes, the subset(s) associated with a first LUN, LUN A, are represented in the diagram of FIG. 4 with a separate LBA sub-numbering scheme "LBA A$\underline{X}$" ("LUN-specific LBA#"), whereas the subset(s) associated with a second LUN, LUN B, are represented in the diagram with a separate LBA sub-numbering scheme "LBA B$\underline{X}$" ("LUN-specific LBA#"). The collective LBAs provide a comprehensive contiguous numbering scheme ("comprehensive LBA#") across both LUN A and LUN B.

Although the subsets/chunks of FIG. 4 are illustrated as having 4 LBAs each, the various subsets/chunks of the respective LUNs may have any number of LBAs, as desired. In an embodiment, a first half of the comprehensive LBAs of the storage may be associated with a first LUN, whereas a second half of the LBAs may be associated with the second LUN.

In the illustrated embodiments, alternating chunks are associated with the separate LUNs, respectively. The performance associated with servicing data access commands may be at least partly affected by the size of chunk used, as leap-frogging of chunks for storing/reading data may be required with increased frequency as chunk size is reduced. Generally, a large enough chunk size may be selected such that the vast majority of data access commands may require access to only a single chunk. For example, chunk sizes may correspond to 64 kB, 512 kB, 1 MB, or other value.

The LBA division scheme implemented may determine how mapping from LUN-specific LBAs to comprehensive LBAs may be performed. In response to receiving a storage access command from a host including a LUN-specific LBA ("LBA") and an address range, embodiments disclosed herein provide for generating one or more translated storage access commands including one or more translated comprehensive LBAs ("TLBA"). Such translated command(s) may be provided to a storage device controller (e.g., SATA controller) associated with a non-volatile storage module. Such translation may be performed at least in part by a bridge controller.

In certain embodiments, generation of translated storage access command(s) may involve determining that the address range associated with a host command crosses a boundary of the alternating subsets of LBAs. As a specific reference example, with reference to the embodiments of FIG. 4, where a LUN-specific LBA A18 is received in association with a host command and associated host data, if the data associated with the command, when stored in contiguous LUN-specific addresses, crosses over the chunk boundary that ends at comprehensive LBA #35, LUN-specific LBA #A19, at least a first translated command may be generated to access the chunk 401 associated with comprehensive LBA #A18, as well as a second translated command to access the next chunk 402 associated with LUN A. The second translated command may specify the starting address of the chunk 402 (i.e., comprehensive LBA #40, LUN-specific LBA #A20). Additional translated command(s) may further be required when the host data spans across additional LUN-specific chunk boundaries. The translated storage access command(s) may be provided to non-volatile storage control circuitry configured to map the translated address(es) to physical address(es) and execute the command(s) in the non-volatile storage.

Determining whether the storage access command crosses a chunk boundary may be performed in any desirable or practical manner. For example, certain embodiments involve identifying a position of the translated LBA within the chunk associated with the LUN-specific LBA and determining whether an address range associated with the command indicates overlap of a chunk boundary. In certain embodiments, a modulo operation is implemented on each of the LUN-specific LBA#'s or comprehensive LBA#'s associated with the host command using the number of LBAs per chunk ("M") as the divisor. The remainder of the modulo operation may indicate whether an LBA is at the beginning or end of a chunk, thereby possibly indicating chunk overlap. For example, if any address of the range of LBAs (LUN-specific or comprehensive), other than the first LBA of the command, is associated with a modulo remainder equal to zero, it may be determined that chunk overlap occurs, and therefore more than one translated storage access command may be necessary.

In certain embodiments, generating a second storage access command when multiple translated commands are necessary may involve identifying a first overlapping LBA within the address range that crosses the boundary of the first LUN-specific chunk associated with the host command, wherein the second storage access command includes a first LBA of the next LUN-specific chunk, data associated with the first overlapping LBA, and a tail address range that comprises a subset of the address range that overlaps the boundary of the first chunk.

Generating translated LBAs ("TLBAs") based on LUN-specific ("LBAs") provided in host commands may be based on the following equation in certain embodiments:

$$TLBA=((LBA/M)\times 2M)+(LBA\% M);$$

where 'M' represents the number of LBAs in a chunk, '/' is a quotient operator, and '%' is a modulo operator.

When the host storage access command is associated with a second LUN, or certain LUN of a plurality of LUNs, translated LBA calculation may require adding a positive or negative off-set value, such as an off-set value equal to the chunk size M. Therefore, in certain embodiments, generating translated LBAs (TLBAs) may be based on the following equation:

$$TLBA=((LBA/M)\times 2M)+(LBA\% M)+M; \text{ or}$$

$$TLBA=((LBA/M)\times 2M)+(LBA\% M)-M;$$

where '/' is a quotient operator and '%' is a modulo operator

Although certain embodiments are described herein in the context of division of logical addressing, it should be understood that the principles disclosed herein may also be applicable to division of physical addressing, wherein separate subsets of physical addresses are assigned to separate LUNs for addressing/mapping purposes. Such division of physical addressing may be conceptually similar to the schemes disclosed herein for division of logical addresses. Any description herein of "logical" address(es) may be understood as being applicable to physical address(es), and vice versa. Furthermore, although certain embodiments are represented in the context of data storage being divided among two LUNs, it should be understood that the principles disclosed herein may be equally applicable in embodiments comprising more than two LUNs. For example, with respect to alternating subsets of logical (or physical) addresses, where more than two LUNs are represented in a data storage division as described herein, each of the represented LUNs may be alternatingly assigned to subsets of the comprehensive addressing scheme.

Figure 5:
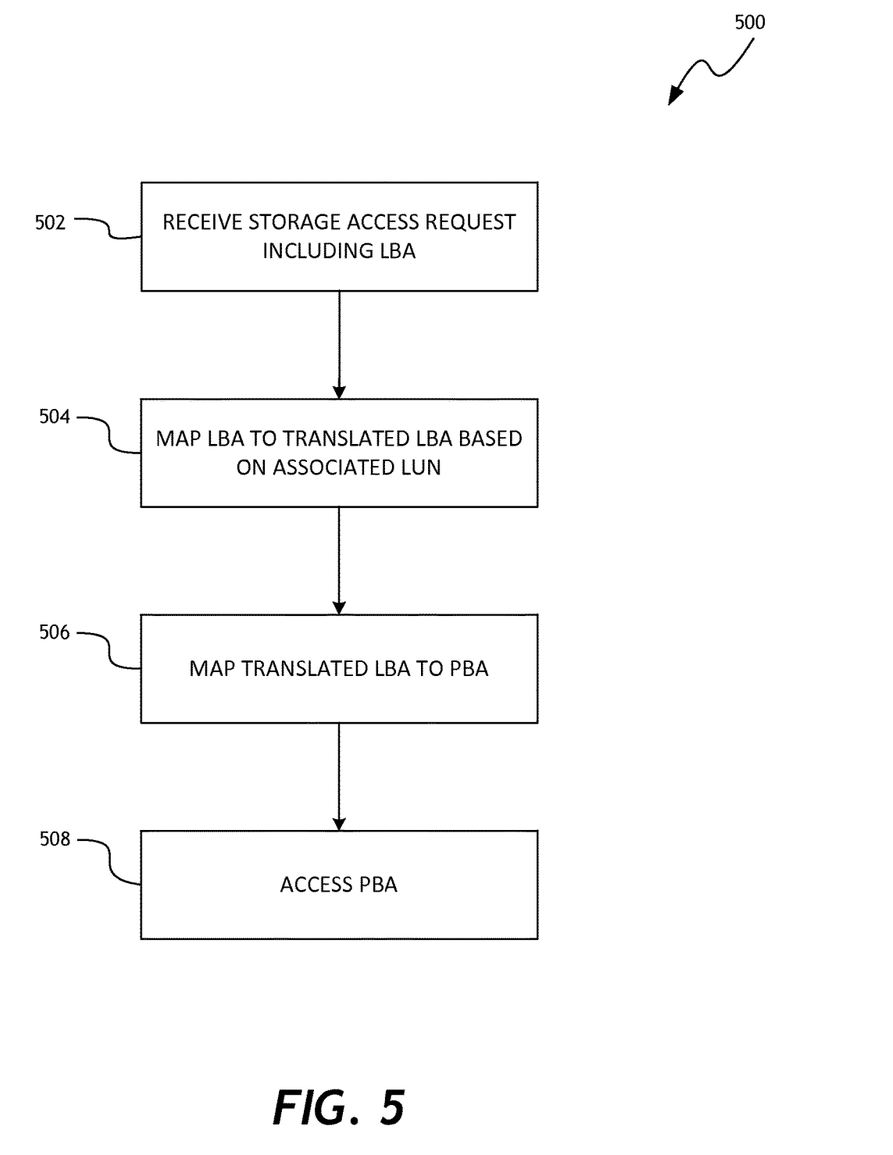
FIG. 5 is a flow diagram illustrating a process 500 for managing data storage according to one or more embodiments.

FIG. 5 is a flow diagram illustrating a process 500 for managing data storage according to one or more embodiments. At block 502, the process 500 involves receiving a storage access request including an LBA. For example, such request may be received from a host coupled to a data storage device. At block 504, the process 500 involves mapping the LBA to a translated LBA based on a LUN identifier associated with the host command. For example, where the received LBA is associated with a first LUN, the LBA may be translated to a first-LUN-specific LBA.

At block 506, the process 500 involves mapping the translated LBA to a physical block address (PBA). A block 508, the process 500 involves accessing the map to PBA. As described in detail herein, the process 500 may allow for a relatively easy and/or reliable mechanism for booting multiple different operating systems substantially independently. In certain embodiments, the process 500 may be performed at least partially under the control of control circuitry of a data storage device.

ADDITIONAL EMBODIMENTS

Those skilled in the art will appreciate that in some embodiments, other types of non-volatile storage division systems can be implemented while remaining within the scope of the present disclosure. In addition, the actual steps taken in the processes discussed herein may differ from those described or shown in the figures. Depending on the embodiment, certain of the steps described above may be removed, and/or others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, application-specific integrated circuit (ASIC), field-programmable gate array (FPGA), or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

As used in this application, "non-volatile solid-state memory," "non-volatile memory," "NVM," or variations thereof may refer to solid-state memory such as NAND flash. However, the systems and methods of this disclosure may also be useful in more conventional hard drives and hybrid drives including both solid-state and hard drive components. Solid-state memory may comprise a wide variety of technologies, such as flash integrated circuits, Phase Change Memory (PC-RAM or PRAM), Programmable Metallization Cell RAM (PMC-RAM or PMCm), Ovonic Unified Memory (OUM), Resistance RAM (RRAM), NAND memory, NOR memory, EEPROM, Ferroelectric Memory (FeRAM), MRAM, or other discrete NVM (non-volatile solid-state memory) chips. The non-volatile solid-state memory arrays or storage devices may be physically divided into planes, blocks, pages, and sectors, as is known in the art. Other forms of storage (e.g., battery backed-up volatile DRAM or SRAM devices, magnetic disk drives, etc.) may additionally or alternatively be used.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A data storage device comprising:
   a non-volatile memory comprising a plurality of physical addresses storing data for a first logical unit number (LUN) and a second LUN;
   controller circuitry configured to:
   receive a storage access request from a host system, the storage access request including a logical address (LBA), an address range, and LUN identification information;
   map the LBA to a translated LBA that is one of N contiguous comprehensive LBAs based on the LBA and the LUN identification information, the comprehensive LBAs being associated with both the first LUN and the second LUN, wherein alternating subsets of M contiguous LBAs of the comprehensive LBAs are associated with the first LUN and the second LUN, respectively;
   map the translated LBA to one of the plurality of physical addresses of the non-volatile memory; and
   read from or write to at least the one of the plurality of physical addresses by at least:
   determining that the address range crosses a boundary of the alternating subsets of LBAs by performing a modulo operation on each of a plurality of LBAs associated with the storage access request and determining that at least one of the modulo operations returns a remainder equal to zero;

generating a first storage access command for accessing a first of the alternating subsets of LBAs associated with the LBA of the storage access request;

generating a second storage access command for accessing a second of the alternating subsets of LBAs; and providing the first and second storage access commands to additional control circuitry associated with the non-volatile memory using a data storage interface.

2. The data storage device of claim 1, wherein the non-volatile memory comprises magnetic disk memory.

3. The data storage device of claim 1, wherein the controller circuitry is further configured to maintain a first boot record in the first LUN and a second boot record in the second LUN.

4. The data storage device of claim 1, wherein M LBAs corresponds to 1 megabyte (MB) of storage.

5. The data storage device of claim 1, wherein said generating the second storage access command comprises:

identifying a first overlapping LBA within the address range that crosses the boundary of the first of the alternating subsets of LBAs, wherein the second storage access command includes a first LBA of the second of the alternating subsets of LBAs, data associated with the first overlapping LBA, and a tail address range that comprises a subset of the address range that overlaps the boundary of the first of the alternating subsets of LBAs.

6. The data storage device of claim 1, wherein:

the first LUN has stored thereon a first operating system;
the second LUN has stored thereon a second operating system; and
each of the first and second operating systems may be booted to the host system independently from the other.

7. The data storage device of claim 1, wherein:

the host system is a mobile computing device;
the data storage device is connected to the host system over a USB interface providing a 5volt (V) power supply; and
the non-volatile memory comprises magnetic disk media.

8. The data storage device of claim 1, wherein the non-volatile memory comprises solid-state memory.

9. The data storage device of claim 1, wherein the data storage device is an external storage device connected to the host system over a physical interface port of the host system.

10. The data storage device of claim 1, wherein said mapping comprises adding an offset number of addresses when the LUN identification information indicates that a storage access command is associated with the second LUN.

11. The data storage device of claim 1, wherein the controller circuitry is further configured to manage the first and second LUNs according to a just a bunch of disks (JBOD) scheme.

12. The data storage device of claim 1, wherein the controller circuitry is further configured to allow access to the first LUN to the host system and limit access to the second LUN to host system.

13. A data storage device comprising:

a non-volatile memory comprising a plurality of physical addresses storing data for a first logical unit number (LUN) and a second LUN;

controller circuitry configured to:

receive a storage access request from a host system, the storage access request including a logical address (LBA), an address range, and LUN identification information;

map the LBA to a translated LBA that is one of N contiguous comprehensive LBAs based on the LBA and the LUN identification information, the comprehensive LBAs being associated with both the first LUN and the second LUN;

map the translated LBA to one of the plurality of physical addresses of the non-volatile memory; and read from or write to at least the one of the plurality of physical addresses;

wherein alternating subsets of M contiguous LBAs of the comprehensive LBAs are associated with the first LUN and the second LUN, respectively, and wherein when the LUN identification information indicates that the storage access request is associated with the first LUN, said mapping the LBA to the translated LBA (TLBA) is based on a first equation:

$$TLBA=((LBA/M) \times 2M)+(LBA\% M),$$

where '/' is a quotient operator and '%' is a modulo operator.

14. The data storage device of claim 13, wherein when the LUN identification information indicates that the storage access request is associated with the second LUN, said mapping the LBA to the TLBA is based on a second equation:

$$TLBA=((LBA/M) \times 2M)+(LBA\% M)+M,$$

where '/' is a quotient operator and '%' is a modulo operator.

15. A method of managing data in a data storage device, the method comprising:

maintaining data for a first logical unit number (LUN) and a second LUN in a non-volatile memory comprising a plurality of physical addresses;

receiving a storage access request from a host system, the storage access request including a logical address (LBA), an address range, and LUN identification information;

mapping the LBA to a translated LBA that is one of N contiguous comprehensive LBAs based on the LBA and the LUN identification information, the comprehensive LBAs being associated with both the first LUN and the second LUN;

mapping the translated LBA to one of the plurality of physical addresses of the non-volatile memory; and accessing at least the one of the plurality of physical address;

wherein alternating subsets of M contiguous LBAs of the comprehensive LBAs are associated with the first LUN and the second LUN, respectively, and wherein when the LUN identification information indicates that the storage access request is associated with the first LUN, said mapping the LBA to the translated LBA (TLBA) is based on a first equation:

$$TLBA=((LBA/M) \times 2M)+(LBA\% M),$$

where '/' is a quotient operator and '%' is a modulo operator.

16. The method of claim 15, wherein said accessing the physical address comprises:

determining that the address range crosses a boundary of the alternating subsets of LBAs;

generating a first storage access command for accessing a first of the alternating subsets of LBAs associated with the LBA of the storage access request;

generating a second storage access command for accessing a second of the alternating subsets of LBAs; and providing the first and second storage access commands to additional control circuitry associated with the non-volatile memory using a data storage interface.

17. The method of claim 16, wherein said determining that the address range crosses a boundary comprises:

identifying a position of the translated LBA within the first of the alternating sets of LBAs; and determining that the address range is greater than a range between the position of the translated LBA and a boundary of the first of the alternating sets of LBAs.

18. The method of claim 17, wherein said generating the second storage access command comprises:

identifying a first overlapping LBA within the address range that crosses the boundary of the first of the alternating subsets of LBAs, wherein the second storage access command includes a first LBA of the second of the alternating subsets of LBAs, data associated with the first overlapping LBA, and a tail address range that comprises a subset of the address range that overlaps the boundary of the first of the alternating subsets of LBAs.

19. The method of claim 15, wherein when the LUN identification information indicates that the storage access request is associated with the second LUN, said mapping the LBA to the TLBA is based on a second equation:

$$TLBA = ((LBA/M) \times 2M) + (LBA\% M) + M,$$

where '/' is a quotient operator and '%' is a modulo operator.

20. The method of claim 15, further comprising:

booting a first operating system stored in the first LUN without booting a second operating system stored in the second LUN first; and booting the second operating system without booting the first operating system.

* * * * *